United States Patent [19]

Kasahara et al.

[11] Patent Number: 4,679,903
[45] Date of Patent: Jul. 14, 1987

[54] OBJECTIVE LENS DRIVING DEVICE

[75] Inventors: Akihiro Kasahara, Tokyo; Kenya Goto; Akira Yamada, both of Yokohama; Shoji Watanabe, Yokosuka, all of Japan

[73] Assignee: Kabushiki Kaisha Toshiba, Kawasaki, Japan

[21] Appl. No.: 687,002

[22] Filed: Dec. 26, 1984

[30] Foreign Application Priority Data

Dec. 27, 1983 [JP] Japan ................................. 58-246306

[51] Int. Cl.$^4$ ............................ G02B 7/04; F16F 7/12; F16F 15/12
[52] U.S. Cl. ..................................... 350/247; 74/574; 188/378; 350/255
[58] Field of Search ................................ 350/247, 255; 369/44–45; 188/378; 74/574, 188, 378; 73/430, 522, 526

[56] References Cited

U.S. PATENT DOCUMENTS

| 4,145,936 | 3/1979 | Vincent et al. | 74/574 |
| 4,472,024 | 9/1984 | Konomura et al. | 350/255 |
| 4,473,274 | 9/1984 | Yano et al. | 350/255 |
| 4,482,986 | 11/1984 | Noda et al. | 350/255 |

FOREIGN PATENT DOCUMENTS

| 0053476 | 6/1982 | European Pat. Off. . |
| 0068757 | 1/1983 | European Pat. Off. . |
| 1374234 | 8/1964 | France ................................. 74/574 |
| 57-210456 | 12/1982 | Japan . |

OTHER PUBLICATIONS

*Patent Abstracts of Japan,* "Three-Dimensional Parallel Driver for Bobbin", vol. 6, No. 59, Apr. 16, 1982.
Patent Abstracts of Japan, "Actuator", vol. 7, No. 184, Aug. 13, 1983.

*Primary Examiner*—William H. Punter
*Attorney, Agent, or Firm*—Schwartz, Jeffery, Schwaab, Mack, Blumenthal & Evans

[57] ABSTRACT

In an objective lens driving device, a movable member shiftable along and rotatable around a vertical shaft is provided for supporting the objective lens to be movable therewith vertically and horizontally. An electromagnetic driving means is provided for driving the movable member as desired. A damper member formed into an annular configuration symmetric around a central axis of a bearing portion provided on the movable member is provided between the movable member and a stationary portion of the device for damping and positioning the movable member for maintaining the objective lens to its neutral position.

12 Claims, 9 Drawing Figures

OBJECTIVE LENS DRIVING DEVICE

BACKGROUND OF THE INVENTION

This invention relates to an objective lens driving device adapted to be used in an optical reproducing apparatus wherein digital information recorded on a disc is reproduced accurately, and more particularly to a device in which a damper mechanism can be inserted easily and the neutral position of the objective lens can be maintained precisely.

Recently digital recording and reproducing apparatus ratus utilizing PCM (Pulse Code Modulation) techniques have become popular in the fields of audio apparatus, because the audio input and output properties of the PCM digital apparatus are not adversely affected by the property of the recording medium and because the recorded and reproduced results thereof are absolutely free from noises. In a case where the recording medium is formed into a circular disc, reproducing apparatus of, for instance, the optical type, electrostatic type and mechanical type have been widely used. Regardless of these types, it is apparent that the reproducing apparatus utilizing the PCM technique requires operational characteristics of far more precision than those in the conventional type reproducing apparatus.

For instance, in the case of an optical type reproducing apparatus to be operated with a compact disc (CD), it is required to read out information recorded on the disc at a pitch of 1.6 microns precisely, and therefore the reading portion of the apparatus should be operable with high precision and dexterity.

In the optical compact disc reproducing apparatus, the information recorded on the disc is ordinarily read through an objective lens. For assuring reproduction of the information at high fidelity, the objective lens must be focused exactly to a groove or pit in which the information is recorded, and the position of the objective lens must be controlled precisely so that it follows a track of the disc without fail. Ordinarily, the focusing and tracking operations of the lens have been realized by holding the objective lens on a lens driving device, and by controlling the lens driving device by means of a servo system with reference to the information signal thus obtained.

The lens driving device which holds the objective lens, and carries out the focusing and tracking operations as described above has been constructed as shown in FIGS. 1, 2 and 3.

In the shown device, a stationary shaft 2 is secured to a central portion of a base plate 1 made of a magnetic material so that the shaft 2 extends vertically upwardly from the base plate 1. A cylindrical member 4 with an upper end thereof closed by a wall 4a is supported by the shaft 2 through a bearing member 3 of a sleeve-like configuration, which is secured vertically to a central portion of the end wall 4a so that the cylindrical member 4 is slidable along and rotatable around the stationary shaft 2.

The end wall 4a of the cylindrical member 4 supports an objective lens 5, while the circumferential wall 4b of the cylindrical member 4 is used as a coil winding bobbin. That is, a focusing coil 6 is wound around the circumferential wall 4b for controlling the vertical position of the cylindrical member 4 along the stationary shaft 2, while a suitable number of pairs of tracking coils 7 are provided at positions spaced apart along the circumferential wall 4b of the cylindrical member 4 for controlling the angular position of the cylindrical member 4 around the shaft 2. Furthermore, at positions symmetric with respect to the shaft 2, a pair of internal yokes 8a and 8b are provided so as to project upwardly from the base plate 1 passing the interior of the circumferential wall 4b in a non-contacting relation, until the upper ends of the internal yokes 8a and 8b are in opposition to the internal surface of the end wall 4a of the cylindrical member 4. A pair of external yokes 9a and 9b are provided on the other hand outwardly of the circumferential wall 4b in a relation opposing to the internal yokes 8a and 8b. Permanent magnets 10 magnetized in the axial direction (vertically as viewed in FIGS. 2 and 3) are interposed between the external yokes 9a and 9b and the base plate 1.

A vertical shaft 11 of a small diameter is secured at the lower end thereof to the base plate 1 so that the upper end of the shaft 11 opposes to the internal surface of the end wall 4a. A damping member 12 made of a flexible material such as rubber is extended between the shaft 11 with a small diameter and the sleeve-like bearing member 3 secured to the end wall 4a of the cylindrical member 4 for defining a neutral position of the focusing and tracking operation of the lens driving device. A light introducing hole 13 is further provided through the base plate 1 for transmitting light entering or coming out of the objective lens through the hole 13.

During the operation of the objective lens driving device, an electromagnetic force produced by energizing the focusing coil 6 moves the cylindrical member 4 vertically in the direction of Y axis for controlling the focus of the objective lens, while an electromagnetic force produced by the energization of the tracking coils 7 rotates the cylindrical member 4 around the central shaft 2 in the direction of, the X axis shown in FIG. 1 for realizing a tracking control of the objective lens. The energizations of the focusing coil 6 and the tracking coils 7 are carried out by a servo system, not shown.

In the above described conventional objective lens driving device, the damping member 12 which defines the neutral position during the focusing and tracking operations is made of a soft material such as rubber formed into an extremely small size. Accordingly, it is extremely difficult to secure the soft and small-size damping member 12 to the shaft 11 and the bearing member 3 so that the objective lens locates at the neutral position precisely, and the elimination of such difficulty has been urgently required

SUMMARY OF THE INVENTION

An object of the present invention is to provide an objective-lens driving device wherein the above described difficulty of the conventional devices can be substantially eliminated.

Another object of the invention is to provide an object lens driving device wherein a damper assembly can be easily inserted between a movable member supporting the objective lens and a stationary member such that an accurate neutral position of the objective lens can be assured.

Still another object of the invention is to provide an objective lens driving device wherein the production of the damper assembly is facilitated and made accurate.

These and other objects of the present invention can be achieved by an objective lens driving device of a type comprising a base, a shaft vertically extending from the central portion of the base, a movable member supporting an objective lens, a slidable bearing mechanism for supporting the movable member to be rotatable around and slidable along the vertical shaft, electromagnetic driving means for rotating and shifting the movable member around and along the vertical shaft, and a coil bobbin provided on the movable member concentrically with a central axis of the slidable bearing mechanism for supporting coil members of the electromagnetic driving means, and the objective lens driving device is characterized in that a damper member is provided between the movable member and predetermined stationary portions of the objective lens driving device and the damper member is formed into an annular configuration so as to surround the movable member around the bearing mechanism for accurately damping both rotational and sliding movements of and positioning the movable member supporting the objective lens.

Preferably, the damper member is connected at four positions along the circumference thereof with movable-side connecting members and stationary-side positioning members, both made of a thin metal plate and secured to the movable member and the stationary portion of the objective lens driving device, respectively.

Preferably, the moving-side connecting members will contain a guideline hole to engage with a mating portion of the movable member, and the stationary-side positioning members will be attached in such a way as to allow adjusting of their positions. Additionally both types of members should be produced at an early time of the production stage in the form of one piece which is thereafter cut into pieces so as to provide the moving-side connecting members and the stationary side positioning members.

DESCRIPTION OF THE PREFERRED EMBODIMENT

The invention will now be described in detail with reference to FIGS. 4 to 7(a), 7 (b) and 7(c).

Figure 4:
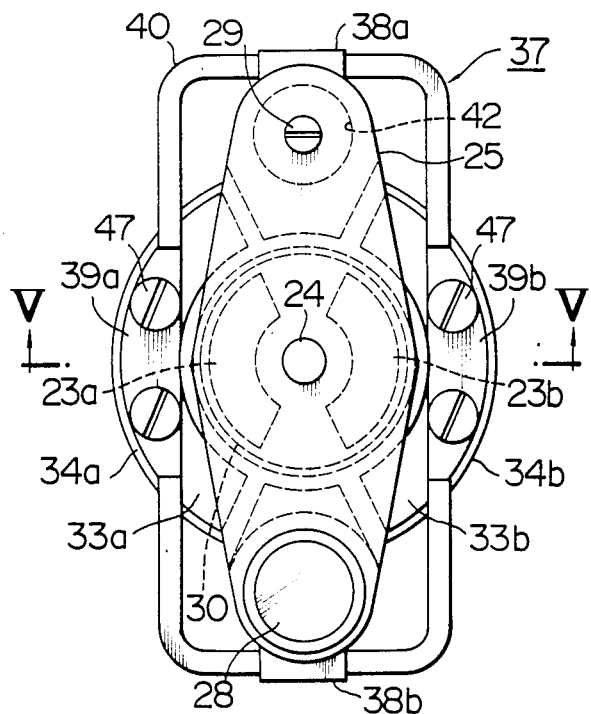
FIG. 4 is a plan view showing an objective lens driving device constituting a preferred embodiment of the invention.
Figure 5:
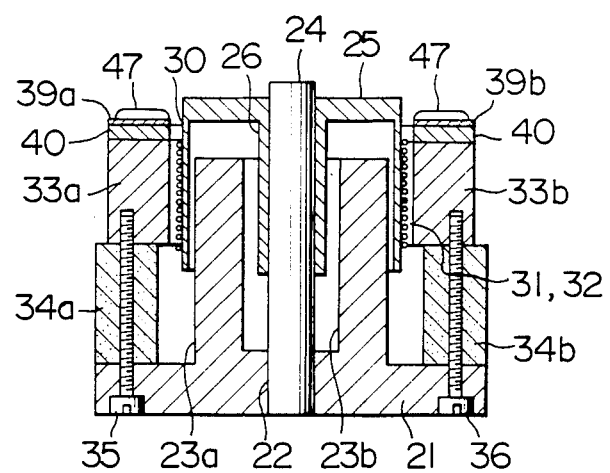
FIG. 5 is a sectional view taken along the line V—V in FIG. 4.
Figure 6:
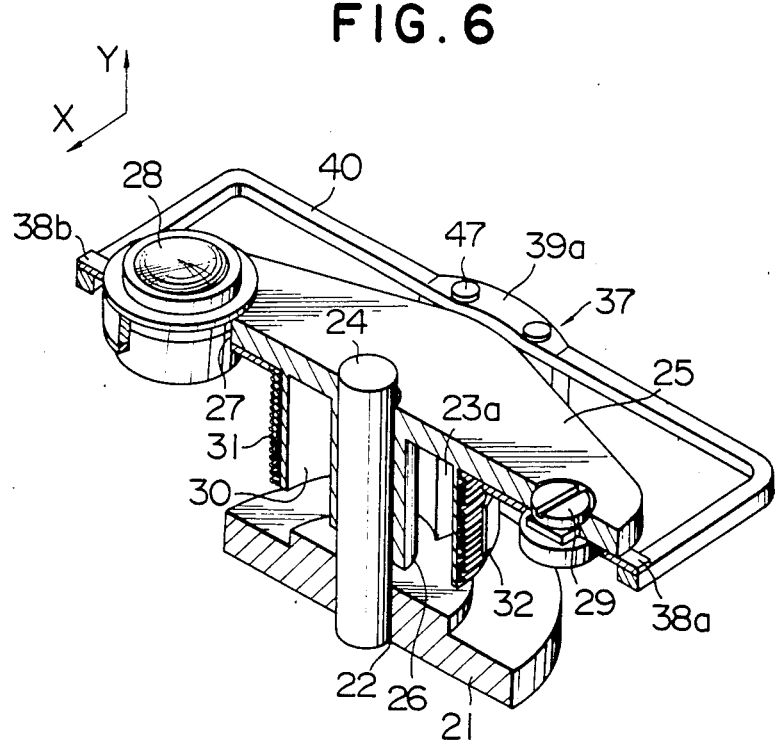
FIG. 6 is a perspective view showing an important part of the embodiment shown in FIG. 4.

In FIGS. 4 to 6, there is illustrated a preferred embodiment of this invention which comprises a base 21 made of a magnetic material and formed into a circular configuration for example. A vertical hole 22 is provided at a substantially central portion thereof. A pair of internal yokes 23a and 23b are provided symmetrically with respect to the hole 22 so that the yokes 23a and 23b project upwardly from the upper surface of the base 21. A vertically extending stationary shaft 24 is provided between the internal yokes 23a and 23b so that the lower end thereof is secured to the central hole 22, for instance, by screw-thread engagement.

On the stationary shaft 24 is mounted a movable member 25 made of a non-magnetic material. The movable member 25 is formed into a symmetrical configuration with respect to a central axis extending vertically. A bearing portion or member 26 formed for instance integrally with the movable member 25 extends downwardly from a central portion of the movable member 25. With the central shaft 24 received in the bearing portion 26, the movable member 25 is made rotatable around and slidable along the central shaft 24. At a longitudinal end of the movable member 25, a hole 27 is provided as shown in FIG. 6. An objective lens 28 is inserted in the hole 27 to be secured to the movable member 25 with the optical axis thereof disposed in parallel with the central axis of the movable member 25.

For the purpose of bringing the center of gravity of the movable member 25 inclusive of the hereinafter described coils and coil bobbin in alignment with the central axis of the movable member 25, a counterweight 29 is secured to the other longitudinal end of the movable member 25 at a position symmetric with that of the objective lens 28 with respect to the central axis.

A coil bobbin 30 having an outer diameter smaller than twice the distance between the center axis of the movable member 25 and the objective lens 28, and an inner diameter larger than the distance between the outer surfaces of the internal yokes 23a and 23b, is provided to extend downwardly from the lower surface of the movable member 25 in a relation concentric with the bearing portion 26. The coil bobbin 30 may be provided to be integral with or separate from the movable member 25. A focusing coil 31 is wound around the bobbin 30, while two pairs of tracking coils 32 are secured to the outer surface of the bobbin 30 at positions symmetric with respect to the central axis of the bobbin 30.

Outwardly of the coil bobbin 30 are provided outer yokes 33a and 33b. Between the outer yokes 33a, 33b and the base 21. There are interposed permanent magnets 34a and 34b magnetized in the axial direction, respectively. The outer yokes 33a and 33b are secured through the permanent magnets 34a and 34b to the base 21 by means of nonmagnetic bolts 35 and 36, respectively. However, when it is preferable, these members may otherwise be bonded together by means of an adhesive agent.

Between the longitudinal end portions of the movable member 25 and the upper ends of the outer yokes 33a and 33b, there is extended a damper assembly 37 essentially comprising movable-side connecting plates 38a and 38b which are made of thin metal plates and secured to the lower surfaces of the longitudinal-end portions of the movable member 25, respectively, by means of screws, bonding agent, rivets and the like, stationary-side positioning plates 39a and 39b also made of a thin metal plate and secured to the upper surfaces of the outer yokes 33a and 33b, respectively, and a damper element 40 made of, for instance, a silicone rubber plate punched into a ring form. The damper assembly 37 is arranged to surround the coil bobbin 30 in a spaced apart relation. The damper element 40 is secured at four positions along its circumference to the lower surfaces of the movable-side connecting plates 38a and 38b and the stationary-side positioning plates 39a and 39b, respectively.

Figure 7A:
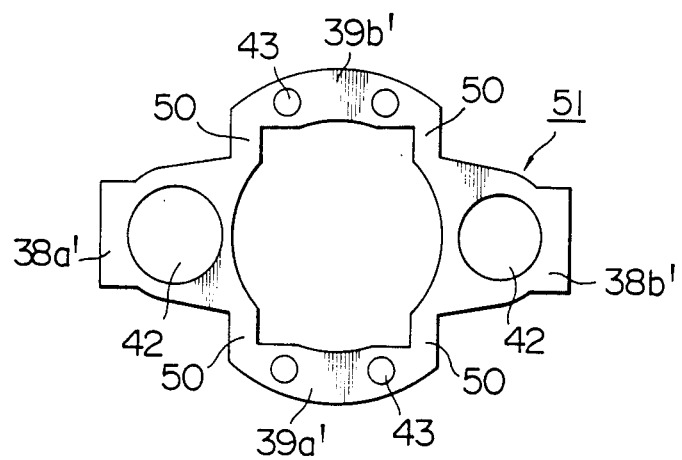
FIGS. 7 (a), 7(b) and 7(c) are plan views for explaining production of a damper assembly.
Figure 7B:
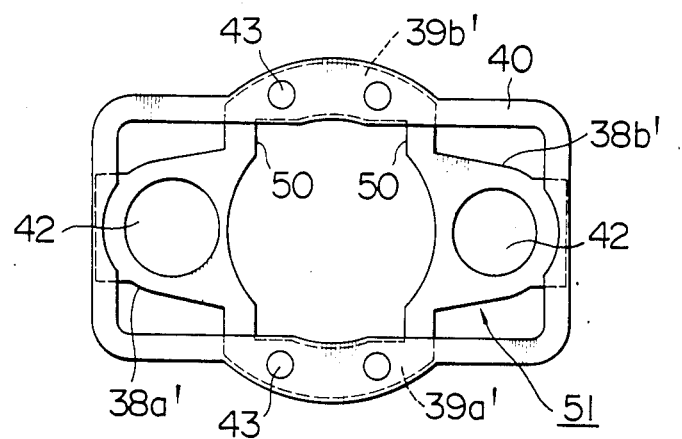
Figure 7C:
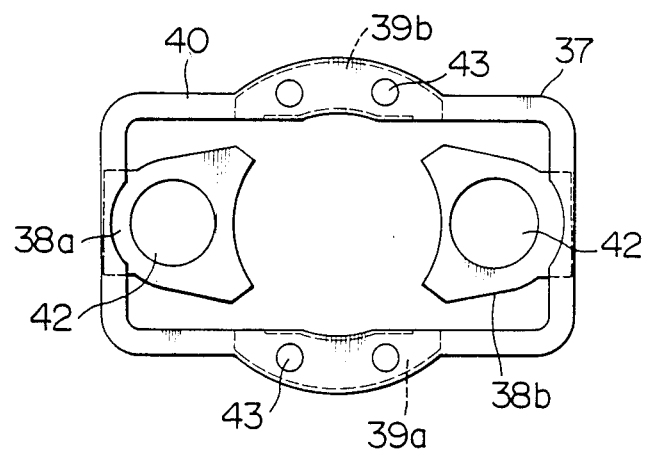

The movable-side connecting plates 38a and 38b are formed into similar configurations, each having at a central portion thereof a positioning hole 42 of a diameter substantially equal to that of the hole 27 as shown in FIG. 7(c). The connecting plates 38a and 38b are further constructed such that when these are secured to both ends of the movable member 25 in opposite disposition at positions determined by the aid of the holes 42, outer ends of the connecting plates 38a and 38b project outwardly beyond the ends of the movable member 25. The stationary-side positioning plates 39a and 39b are also made of a thin metal plate having a thickness substantially equal to that of the connecting plates 38a and 38b, and formed into similar configurations, each having two positioning holes 43 as shown in FIG. 7(c).

The damper element 40 may be formed into a rectangular frame-like configuration having a longitudinal length substantially equal to that of the movable member 25, and a transverse length somewhat longer than the outside diameter of the coil bobbin 30. The damper element 40 is formed longitudinally and transversely symmetrical, and is secured to the lower side of the movable-side connecting plates 38a and 38b and the stationary-side positioning plates 39a and 39b by means of a bonding agent or by forming the damper element integrally with the connecting plates and the positioning plates according to an outserting procedure or else, so that the central point of each transverse limb of the damper element 40 coincides with the central point of the portion of the movable-side connecting plate projecting outwardly beyond the movable member 25, and that the central point of a longitudinal limb of the damper element 40 coincides with the central point of corresponding one of the stationary-side positioning plates 39a and 39b.

The damper assembly 37 of the above described construction is secured to the upper surfaces of the outer yokes 33a and 33b through the stationary-side positioning plates 39a and 39b. More specifically, screw threaded holes (not shown) are provided in the upper surfaces of the outer yokes 33a and 33b at positions aligning with the positioning holes 43 provided through the positioning plates 39a and 39b, and screws 47 are driven through the positioning holes 43 of the positioning plates 39a and 39b into the holes, not shown, of the upper surfaces of the outer yokes 33a and 33b.

The damper assembly 37 may be produced as follows A blank 51 made of a thin metal plate and formed into a configuration wherein the movable-side connecting plates 38a' and 38b' are connected with the stationary-side positioning plates 39a' and 39b' through connecting portions 50 as shown in FIG. 7(a) is prepared. The damper element 40 formed beforehand into the frame-like configuration is secured to the blank 51 by means of a bonding agent or else, or by forming the blank and others into an integral member according to an outsert-forming procedure as shown in FIG. 7(b), and then the connecting portions 50 are removed as shown in FIG. 7(c) thereby providing the damper assembly 37.

With the above described construction and arrangement of the damper assembly, although the movable member 25 is shifted along the Y axis shown in FIG. 6 by energizing the focusing coil 31 to thereby carry out the focusing control and rotated in the direction of the X axis by energizing the tracking coil 32 to thereby carry out the tracking control as described hereinbefore, in this case, since the damper assembly 37 is formed in a completely axially symmetrical manner around the shaft 24, even if the movable member 25 is shifted in the axial direction, the damper assembly 37 can maintain the balanced condition by the balanced moments created for the portions of the damper assembly 37 opposing with respect to the shaft 24 in directions normal thereto. As a consequence, the creation of harmful counterforces applied vertically to the shaft 24 can be substantially eliminated, and tracking and focusing of the objective lens driving device can be much facilitated.

Since the damper assembly 37 comprises the damper element 40, movable-side connecting plates 38a and 38b, and the stationary-side positioning plates 39a and 39b, the damper assembly 37 can be easily assembled into the lens driving device by simply securing the connecting plates 38a' and 38b' to the longitudinal ends of the movable member 25 and the positioning plates 39a and 39b to the stationary parts of the lens driving device, respectively. Thus the hereinbefore described necessity of securing the soft damper element 40 to the movable member and the stationary member of the conventional device directly can be completely eliminated, and the assembling operation and the neutral setting operation of the driving device can be substantially simplified. Furthermore, since the damper assembly is constructed as described above, the movable-side connecting plates 38a and 38b and the stationary-side positioning plates 39a and 39b can be bonded beforehand to the damper element 40, or the connecting plates and the positioning plates can be formed beforehand integrally with the damper element 40 by use of a high temperature fusion method, outsert moulding method and the like without damaging the coils and the bearing.

With the above described damper assembly, relative displacement of the connecting plates and the positioning plates can be substantially reduced in comparison with a case where these plates are independently secured to the damper element, and the setting of the neutral position is assured as a result of the reduction of the displacement.

Figure 1:
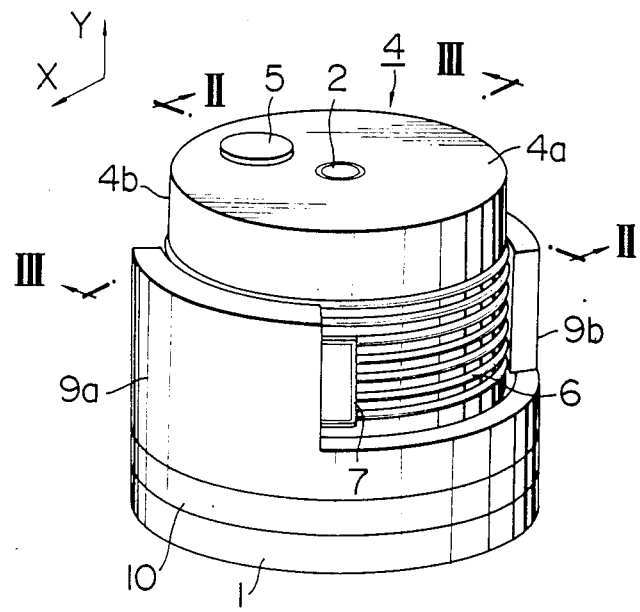
FIG. 1 is a perspective view of a conventional objective lens driving device.
Figure 2:
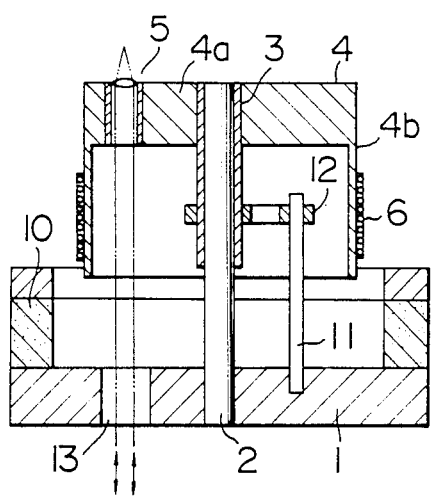
FIG. 2 is a sectional view taken along the line II—II in FIG. 1.
Figure 3:
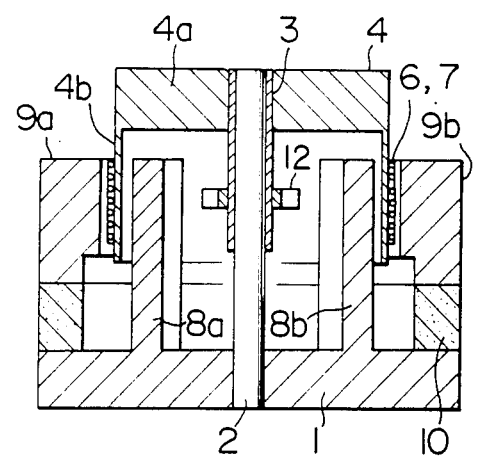
FIG. 3 is a sectional view taken along the line III—III in FIG. 1.

Although this invention has been described with respect to a preferred embodiment thereof, it is apparent that the invention is not necessarily limited to such an embodiment, and various modifications and alterations can be carried out within the scope of the invention as defined in the appended claims. For instance, the invention may otherwise be applied to an objective lens driving device of a holding cylinder type as shown in FIG. 1, or the shaft may be secured to the movable member, while the bearing portion may be provided on the base. Otherwise, the damper assembly may be somewhat deviated from the above described symmetrical construction around the shaft.

What is claimed is:

1. An object lens driving device comprising:
a base;
a shaft vertically extending from a central portion of said base;
a movable member supporting an objective lens;
bearing means for supporting said movable member to be rotatable around and slidable along said vertical shaft;
electromagnetic driving means for rotating and shifting said movable member around and along said shaft;
a coil bobbin provided on said movable member to extend concentrically with said bearing means for supporting coil means of said electromagnetic driving means; and
means including a damper member provided between said movable member and predetermined stationary portions of the objective lens driving device, said damper member being formed into an annular configuration so as to surround said movable member to be symmetric around a central axis of said bearing means for accurately damping both rotational and sliding movements and repositioning to a neutral position of said movable member supporting the objective lens, said damper member being connected along the circumference thereof with movable-side connecting members and stationary-side positioning members secured to said movable member and the predetermined stationary portions of the objective lens driving device, respectively.

2. An objective lens driving device as set forth in claim 1 wherein said damper member is formed to be symmetric with respect to a longitudinal axis and a transverse axis thereof.

3. An objective lens driving device as set forth in claim 1 wherein said bearing means is formed integrally with said movable member for supporting the same to be rotatable around and slidable along said vertical shaft.

4. An objective lens driving device as set forth in claim 1 wherein said electromagnetic driving means comprises a pair of internal yokes and a pair of outer yokes provided internally and externally of said coil bobbin at mutually opposing positions, and said coil means consisting of a focusing coil wound around said coil bobbin and pairs of tracking coils secured to the coil bobbin at positions symmetric around the central axis of the coil bobbin.

5. An objective lens driving device as set forth in claim 1 wherein said movable-side connecting members and said stationary-side positioning members are initially formed into one combined piece through connecting portions, and wherein said damper member is secured to predetermined positions of said piece, and then said connecting portions are removed thereby providing a damper assembly.

6. An objective lens driving device as set forth in claim 1 wherein said movable-side connecting members are bonded to longitudinal ends of said movable member, while said stationary-side positioning members are secured to said stationary portion of the objective lens driving device in such a manner that positions of the positioning members are adjustable.

7. An objective lens driving device as set forth in claim 1 wherein each of said movable-side connecting members is provided with a guide hole engageable with a mating portion of said movable member.

8. An objective lens driving device as set forth in claim 1, wherein said damper member comprises a generally rectangular frame-like configuration and is made of a resilient material.

9. An objective lens driving device as set forth in claim 8, wherein said damper member has a length substantially equal to the length of said movable member, and a width somewhat longer than the outside diameter of said coil bobbin.

10. An objective lens driving device as set forth in claim 8, wherein said damper member is made of silicone rubber.

11. An objective lens driving device as set forth in claim 8, wherein said damper member is secured at its longitudinal ends to said movable member and at its transverse sides to said electromagnetic driving means.

12. An objective lens driving device as set forth in claim 1, wherein said damper member is connected at four positions along the circumference thereof with movable-side connecting members and stationary-side positioning members both made of a thin metal plate.

* * * * *